United States Patent
Takakuwa (10) Patent No.: US 11,027,779 B2
(45) Date of Patent: Jun. 8, 2021

(54) FRONT VEHICLE BODY STRUCTURE

(71) Applicant: HONDA MOTOR CO., LTD., Tokyo (JP)

(72) Inventor: Keisuke Takakuwa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 8 days.

(21) Appl. No.: 16/623,804

(22) PCT Filed: Jul. 7, 2017

(86) PCT No.: PCT/JP2017/024981
§ 371 (c)(1),
(2) Date: Dec. 18, 2019

(87) PCT Pub. No.: WO2019/008747
PCT Pub. Date: Jan. 10, 2019

(65) Prior Publication Data
US 2020/0207418 A1 Jul. 2, 2020

(51) Int. Cl.
*B62D 21/11* (2006.01)
*B62D 21/15* (2006.01)
(Continued)

(52) U.S. Cl.
CPC ............ *B62D 21/11* (2013.01); *B62D 21/155* (2013.01); *B62D 25/082* (2013.01); *B62D 27/02* (2013.01); *B62D 27/06* (2013.01); *B62D 29/008* (2013.01)

(58) Field of Classification Search
CPC .... B62D 21/11; B62D 21/155; B62D 25/082; B62D 27/02; B62D 27/06; B62D 29/008
(Continued)

(56) References Cited

U.S. PATENT DOCUMENTS 9,067,621 B2 * 6/2015 Ohhama .............. B23K 20/122
9,764,764 B2 * 9/2017 Irle ...................... B62D 65/024
(Continued)

FOREIGN PATENT DOCUMENTS

JP 2012-148334 8/2012
JP 5444198 3/2014
(Continued)

OTHER PUBLICATIONS

International Search Report and Written Opinion for International Application Serial No. PCT/JP2017/024981 dated Aug. 29, 2017, 8 pages.
(Continued)

*Primary Examiner* — Pinel E Romain
(74) *Attorney, Agent, or Firm* — Amin, Turocy & Watson LLP (57) ABSTRACT

A front vehicle body structure includes a sub-frame. The sub-frame includes left and right longitudinal frames which extend in a longitudinal direction of a vehicle body and a horizontal frame which connects rear portions of the left and right longitudinal frames. The left longitudinal frame includes a steel frame and a light metal frame. A rear member of the steel frame overlaps the light metal frame in a vertical direction and is joined to the light metal frame. The left longitudinal frame includes a bent portion. The bent portion is provided on the front side of the vehicle body with respect to a front end portion of the light metal frame.

4 Claims, 11 Drawing Sheets

(51) Int. Cl.
  *B62D 25/08* (2006.01)
  *B62D 27/02* (2006.01)
  *B62D 27/06* (2006.01)
  *B62D 29/00* (2006.01)

(58) Field of Classification Search
  USPC .................................................. 296/203.02
  See application file for complete search history.

(56) References Cited

U.S. PATENT DOCUMENTS

| | | | | |
|---|---|---|---|---|
| 2006/0284449 | A1* | 12/2006 | Miyahara | B62D 21/11 |
| | | | | 296/204 |
| 2012/0006607 | A1* | 1/2012 | Ohashi | B60L 1/003 |
| | | | | 180/65.31 |
| 2012/0175916 | A1* | 7/2012 | Rawlinson | B62D 21/152 |
| | | | | 296/203.02 |
| 2012/0187720 | A1* | 7/2012 | Tomozawa | B62D 25/082 |
| | | | | 296/187.09 |
| 2013/0249250 | A1 | 9/2013 | Ohhama et al. | |
| 2014/0062129 | A1* | 3/2014 | Syed | B60R 19/24 |
| | | | | 296/187.1 |
| 2016/0023681 | A1 | 1/2016 | Fujikawa et al. | |
| 2017/0008565 | A1 | 1/2017 | Murata et al. | |
| 2018/0290688 | A1* | 10/2018 | Kirimoto | F16F 7/12 |
| 2020/0156485 | A1* | 5/2020 | Kamikihara | B60K 1/04 |
| 2020/0164922 | A1* | 5/2020 | Park | B62D 21/11 |

FOREIGN PATENT DOCUMENTS

| | | |
|---|---|---|
| JP | 2014-073805 | 4/2014 |
| JP | 2016-060311 | 4/2016 |
| JP | 2017-013747 | 1/2017 |
| WO | 2014/162880 | 10/2014 |

OTHER PUBLICATIONS

International Preliminary Report on Patentability for International Application Serial No. PCT/JP2017/024981 dated Oct. 15, 2019.

* cited by examiner

FRONT VEHICLE BODY STRUCTURE

TECHNICAL FIELD

The present invention relates to a front vehicle body structure.

BACKGROUND ART

As a front vehicle body structure, one in which a sub-frame is provided below a front side frame and a rear portion of the sub-frame is supported by a vehicle body frame through a link stay so as to be rotatable downward is known. Specifically, the rear portion of the sub-frame is connected to the vehicle body frame along with a front portion of the link stay and a rear portion of the link stay is supported by the vehicle body frame so as to be movable downward.

According to this front vehicle body structure, when an impact load is input from the front side of the vehicle body to the sub-frame, the sub-frame is bent downward at a center portion and the rear portion of the sub-frame is separated downward from the vehicle body frame. When the sub-frame is further deformed, the sub-frame rotates downward about a support bolt along with the link stay.

In this state, the link stay is bent downward so that the sub-frame is guided to the lower side of a vehicle compartment. Thus, a power source, a gear box, and the like are displaced below. Accordingly, intrusion into a vehicle compartment such as a power source and a gear box can be inhibited (for example, see Patent Literature 1).

Here, among sub-frames, one in which a front portion of a longitudinal frame is formed with a steel frame in a closed cross-section and a rear portion is formed with a light metal frame and a steel frame in a closed cross-section is known. The light metal frame and the steel frame are joined by friction stir welding (for example, see Patent Literature 2).

CITATION LIST

Patent Literature

Patent Literature 1: Japanese Unexamined Patent Application, First Publication No. 2014-73805
Patent Literature 2: Japanese Patent No. 5444198

SUMMARY OF INVENTION

Technical Problem

Incidentally, in the sub-frame of Patent Literature 2, a front end portion of a joint portion obtained by joining the light metal frame and the steel frame is located at the center portion of the longitudinal frame. Thus, when the sub-frame of Patent Literature 2 is bent downward at the center portion as in the sub-frame of Patent Literature 1, it is thought that stress is concentrated on the joint portion between the light metal frame and the steel frame.

For this reason, there is a possibility that the strength of the joint portion will need to be compensated by fastening the joint portion using a bolt or the like through friction stir welding.

Here, an object of the present invention is to provide a front vehicle body structure capable of preferably bending a longitudinal frame at a bent portion without compensating the strength of a joint portion between a light metal frame and a steel frame.

Solution to Problem

The front vehicle body structure of an aspect according to the present invention adopts the following configuration in order to solve the above-described problems.

(1) A front vehicle body structure of an aspect according to the present invention is a front vehicle body structure in which a sub-frame is provided below a power unit room of a front portion of a vehicle, wherein the sub-frame includes a pair of longitudinal frames extending in a longitudinal direction of a vehicle body and a horizontal frame connecting rear portions of the longitudinal frames, wherein the longitudinal frame includes a steel frame made of steel and a light metal frame made of light metal, wherein a part of the steel frame overlaps the light metal frame in a vertical direction and is joined to the light metal frame, wherein the longitudinal frame includes a bent portion starting to be bent in the vertical direction, and wherein the bent portion is provided on the front side of the vehicle body with respect to a front end portion of the light metal frame.

(2) In the front vehicle body structure of the aspect (1), the steel frame may include a front member having a closed cross-section extending in the longitudinal direction of the vehicle body and a rear member disposed below the light metal frame, the rear member may be joined to the light metal frame by friction stir welding, and the bent portion may be provided in a portion on the front side of the vehicle body with respect to a front end portion of the rear member in the front member.

(3) In the front vehicle body structure of the aspect (2), the sub-frame may include a mount member for attaching the sub-frame to the vehicle body, the light metal frame may have a second closed cross-section extending in the longitudinal direction of the vehicle body between the light metal frame and the rear member, the second closed cross-section may have a narrow closed cross-section having a cross-section decreasing in size in a vehicle width direction, and a mount fastening portion fastening the mount member, the light metal frame, and the front member may be provided in a corresponding portion of the narrow closed cross-section in the vehicle width direction.

(4) In the front vehicle body structure of the aspect (3), the mount member may include a second mount fastening portion fastened to the narrow closed cross-section.

(5) In the front vehicle body structure of any one of the aspects (1) to (4), the sub-frame may include a vertical fastening portion fastening the steel frame and the light metal frame in the vertical direction and a joint portion obtained by joining the steel frame and the light metal frame through friction stir welding may be provided further to the rear in the vehicle body with respect to the vertical fastening portion.

Advantageous Effects of Invention

According to the aspect (1), the bent portion is provided in the longitudinal frame and the longitudinal frame is bent in the vertical direction at the bent portion as the starting point. This bent portion is provided on the front side of the vehicle body with respect to the front end of the light metal frame. Thus, the bent portion is provided in a portion (that is, a portion of only the steel frame) not overlapping the light metal frame in the longitudinal frame. The steel frame is a frame which is suitably deformed by an impact load input due to a front collision or the like. Accordingly, the longitudinal frame can be preferably bent in the vertical direction at the bent portion (that is, a portion of a single steel frame) as the starting point by an impact load input due to a front collision or the like.

Thus, it is possible to preferably bend the longitudinal frame at the bent portion without compensating the strength of the joint portion between the light metal frame and the steel frame.

According to the aspect (2), the steel frame is divided into the front member and the rear member and the bent portion is provided on the side of the front member. Thus, it is possible to prevent stress concentration on a portion obtained by joining the rear member and the light metal frame through friction stir welding. Accordingly, since the rear member and the light metal frame are fastened by a bolt or the like, there is no need to excessively increase the joining strength.

Further, the bent portion is created at a position not overlapping the rear member. Thus, since the bent longitudinal frame comes into contact with the light metal frame when the longitudinal frame is bent at the bent portion in the vertical direction by an impact load due to a front collision or the like, there is no concern of bending of the longitudinal frame being hampered. Accordingly, it is possible to preferably bend the longitudinal frame at the bent portion in the vertical direction.

According to the aspect (3), the mount member, the light metal frame, and the front member are fastened by the mount fastening portion and the mount fastening portion is provided in the narrow portion. Thus, it is possible to compensate the rigidity of the light metal frame decreased in the narrow portion using the mount fastening portion. Accordingly, it is possible to prevent the longitudinal frame from being bent in the narrow portion.

According to the aspect (4), the second mount fastening portion is fastened to the second closed cross-section at the narrow portion. Accordingly, it is possible to prevent relative displacement of the steel frame and the second closed cross-section and to further reliably prevent the bending at the narrow portion.

According to the aspect (5), the longitudinal frame (specifically, the steel frame) is bent in the vertical direction at the bent portion. For this reason, the light metal frame receives a force causing it to separate from the steel frame in the vertical direction.

Here, the joint portion between the steel frame and the light metal frame is provided on the rear side of the vehicle body with respect to the vertical fastening portion. Thus, a vertical force of separating the steel frame from the light metal frame can be supported by the vertical fastening portion. Accordingly, it is possible to prevent stress concentration on the joint portion between the steel frame and the light metal frame.

DESCRIPTION OF EMBODIMENTS

An embodiment of the present invention will be described with reference to the drawings. In the drawings, an arrow FR denotes forward in the vehicle, an arrow UP denotes upward in the vehicle, and an arrow LH denotes leftward in the vehicle.

Additionally, a front vehicle body structure 10 has a substantially bilaterally symmetric configuration. Thus, the left side configuration will be described below and the description of the right side configuration will be omitted.

Figure 1:
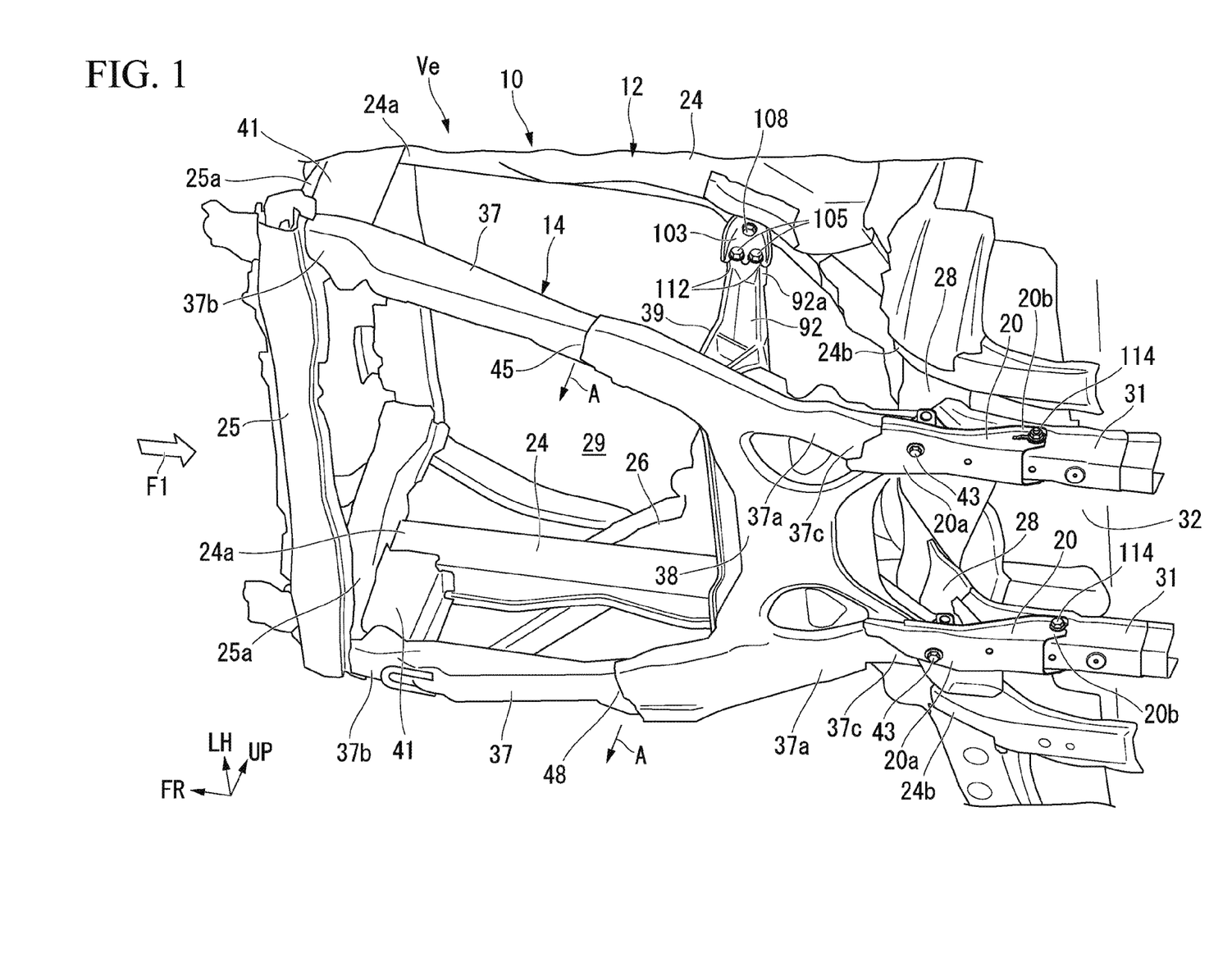
FIG. 1 is a perspective view showing a front vehicle body structure of an embodiment of the present invention.
Figure 2:
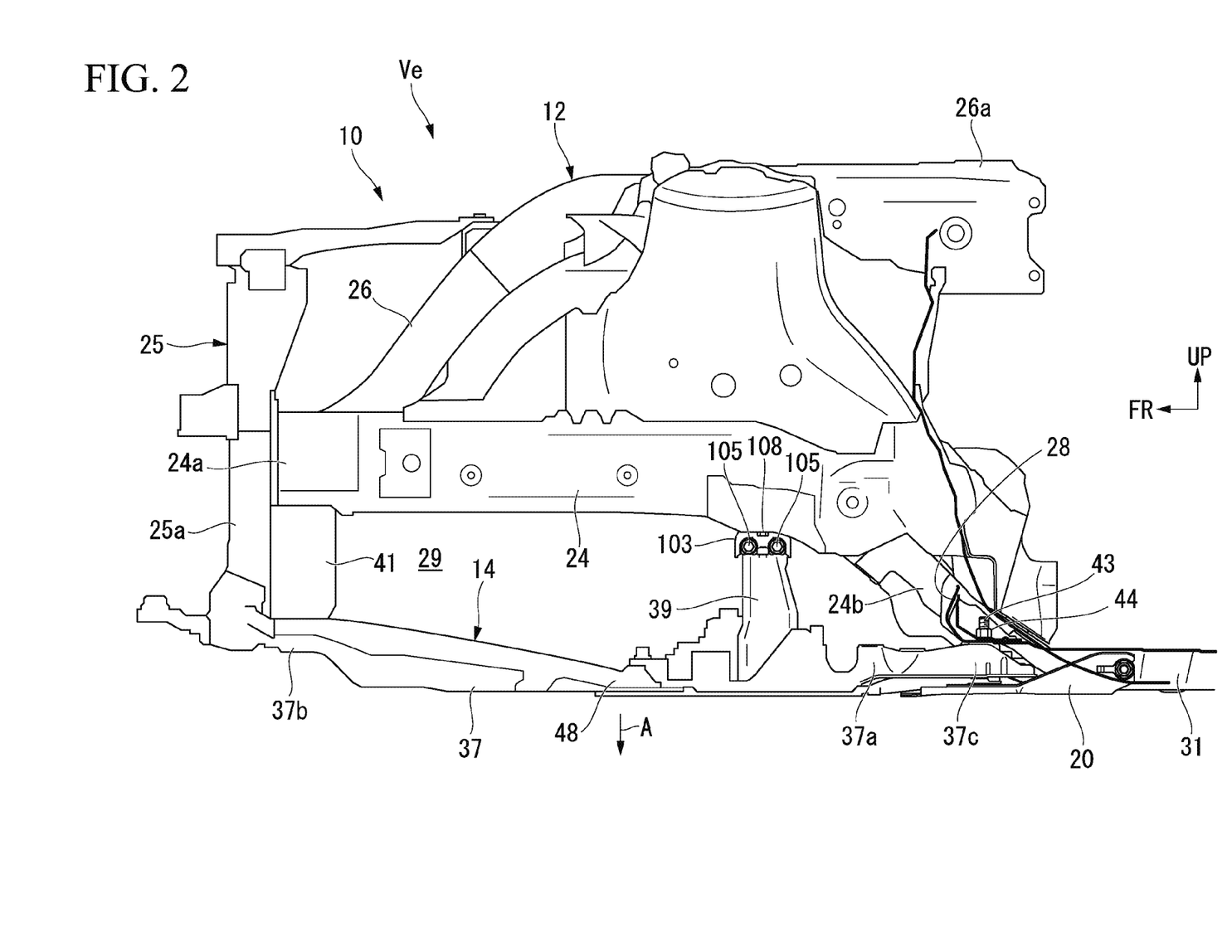
FIG. 2 is a side view showing the front vehicle body structure of an embodiment of the present invention.

As shown in FIGS. 1 and 2, the front vehicle body structure 10 includes a vehicle body frame 12 which forms a front skeleton of a vehicle Ve, a sub-frame 14 which is attached to the lower portion of the vehicle body frame 12, and left and right link stays 20 which are connected to the sub-frame 14.

The vehicle body frame 12 includes left and right front side frames 24 which are provided on outer sides in the vehicle width direction, a front bulkhead 25 which is provided in front end portions 24a of the left and right front side frames 24, left and right upper members 26 which are provided above the left and right front side frames 24, left and right fastening brackets 28 which are provided on the side of rear portions 24b of the left and right front side frames 24, and left and right floor frames 31 which extend from the rear portions 24b of the left and right front side frames 24 toward the rear side of the vehicle body.

A rear floor panel 32 is supported by the left and right floor frames 31.

The left front side frame 24 is disposed on the left side of the vehicle Ve and extends in the longitudinal direction of the vehicle body. The front bulkhead 25 is provided in the front end portions 24a of the left front side frame 24 and the right front side frame 24. A cooling unit such as a radiator is attached to the front bulkhead 25.

Further, the left upper member 26 is disposed above the left front side frame 24.

A rear end portion 26a of the left upper member 26 is connected to a front pillar. A front end portion of the left upper member 26 is connected to the front end portion 24a of the left front side frame 24 through a connection member.

The sub-frame 14 is attached to the lower portions of the left front side frame 24 and the right front side frame 24. A power unit room 29 is formed at the front portion of the vehicle by the left and right front side frames 24, the front bulkhead 25, and the sub-frame 14. The sub-frame 14 is provided below the power unit room 29.

A power unit such as an engine and a transmission or a motor, a suspension part such as a suspension arm, and a steering member are disposed in the power unit room 29. The power unit, the suspension part, and the steering member are attached to the sub-frame 14.

Figure 3:
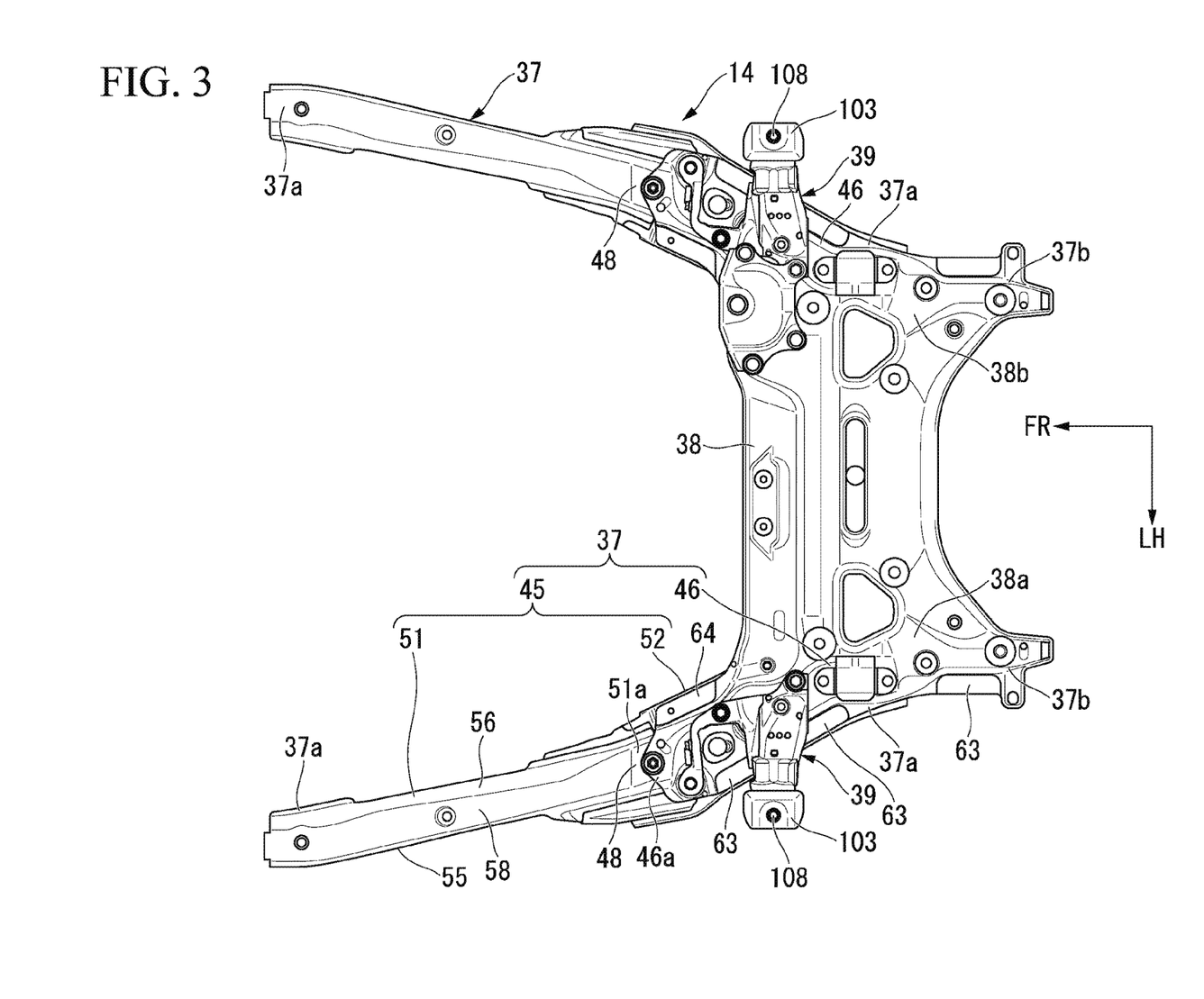
FIG. 3 is a plan view showing a sub-frame of an embodiment of the present invention.
Figure 4:
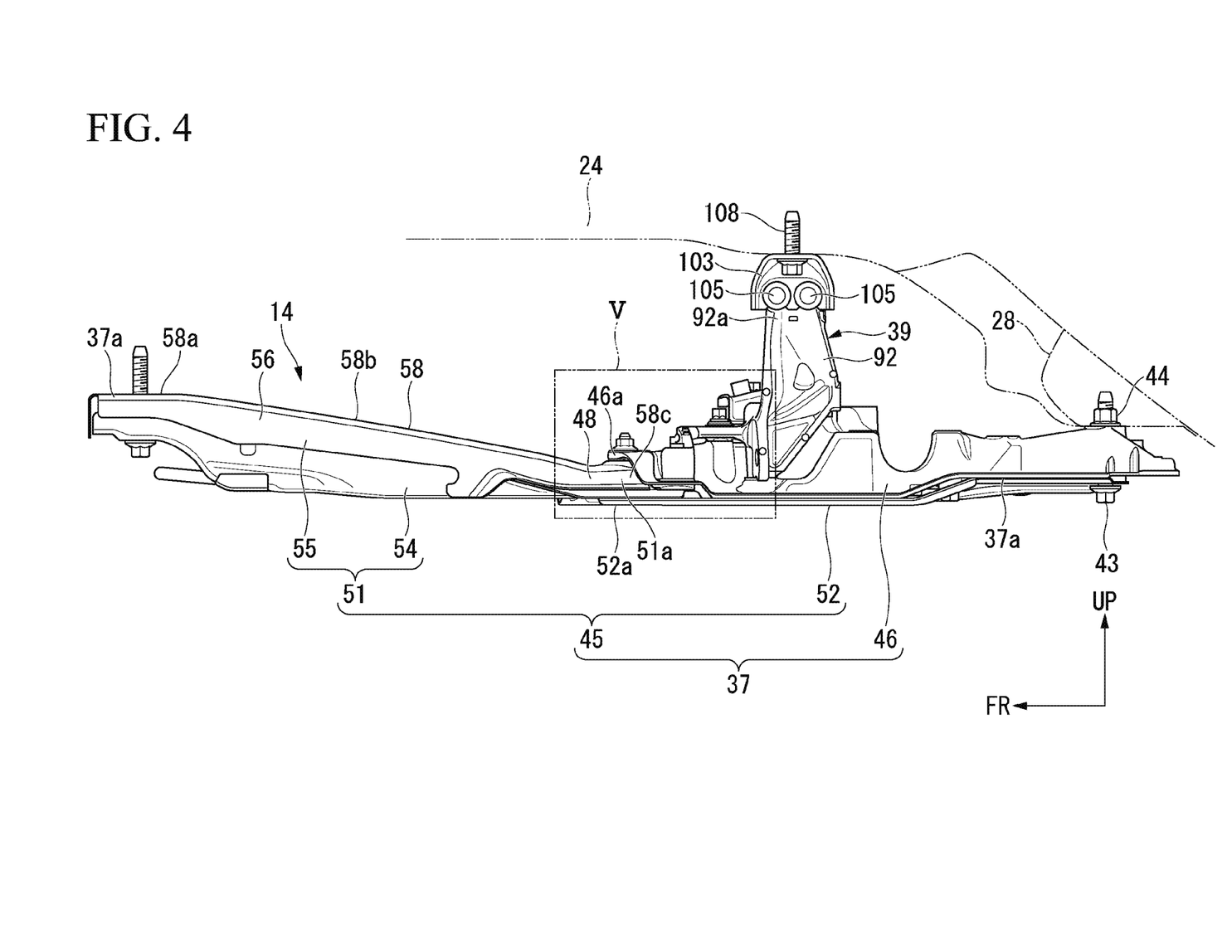
FIG. 4 is a side view showing the sub-frame of an embodiment of the present invention.

As shown in FIGS. 3 and 4, the sub-frame 14 includes left and right longitudinal frames 37 (a pair of longitudinal frames 37), a horizontal frame 38 which connects rear portions 37a of the left and right longitudinal frames 37, a left mount member 39 which is provided on the side of the rear portion 37a of the left longitudinal frame 37, and a right mount member 39 which is provided on the side of the rear portion 37a of the right longitudinal frame 37.

Additionally, the sub-frame 14 is a substantially bilaterally symmetric member. Hereinafter, the left side member will be described and detailed description of the right side member will be omitted.

Returning to FIGS. 1 and 2, the left longitudinal frame 37 includes a front end portion 37b which is connected to a lower end portion of the front connection member 41 by a bolt from below, a rear end portion 37c which is connected to a left fastening bracket 28 by a first bolt 43 and a nut 44 from below, and a bent portion 48 which is provided between the front end portion 37b and the rear portion 37a.

The front connection member 41 extends from the front end portion 24a of the left front side frame 24 downward along the left leg portion 25a of the front bulkhead 25.

The bent portion 48 is formed to be bent in the vertical direction (specifically, downward) by an impact load F1 when the impact load F1 is input from the front side of the vehicle.

As shown in FIGS. 3 and 4, the left longitudinal frame 37 extend along the longitudinal direction of the vehicle body. The left longitudinal frame 37 includes a steel frame 45 made of steel and a light metal frame 46 made of light metal.

The steel frame 45 is made of, for example, a steel material. The light metal frame 46 is made of, for example, an aluminum alloy or a magnesium alloy. Since the light metal frame 46 is made of an aluminum alloy and a magnesium alloy, the light metal frame 46 (that is, the front vehicle body structure 10) can be decreased in weight.

The steel frame 45 includes a front member 51 and a rear member 52 (a part of the steel frame 45). The front member 51 includes a first member 54 disposed on the lower side and a second member 55 disposed on the upper side. The first member 54 and the second member 55 are joined to each other while overlapping each other in the vertical direction. The first member 54 is formed in a U-shaped cross-section opening upward. The second member 55 is formed with a U-shaped cross-section opening downward.

Since the first member 54 and the second member 55 are joined to each other while overlapping each other in the vertical direction, the front member 51 is formed with a first closed cross-section (a closed cross-section) 56. The front member 51 extends in the longitudinal direction of the vehicle body while being formed with a first closed cross-section 56.

A rear portion 51a of the front member 51 is provided with the bent portion 48.

The bent portion 48 is provided in a portion on the front side of the vehicle body with respect to a front end portion 52a of the rear member 52 in the rear portion 51a of the front member 51. That is, the bent portion 48 is provided on the front side of the vehicle body with respect to a front end portion 46a of the light metal frame 46. The bent portion 48 is a portion to be a starting point at which the left longitudinal frame 37 is bent in the vertical direction.

Figure 5:
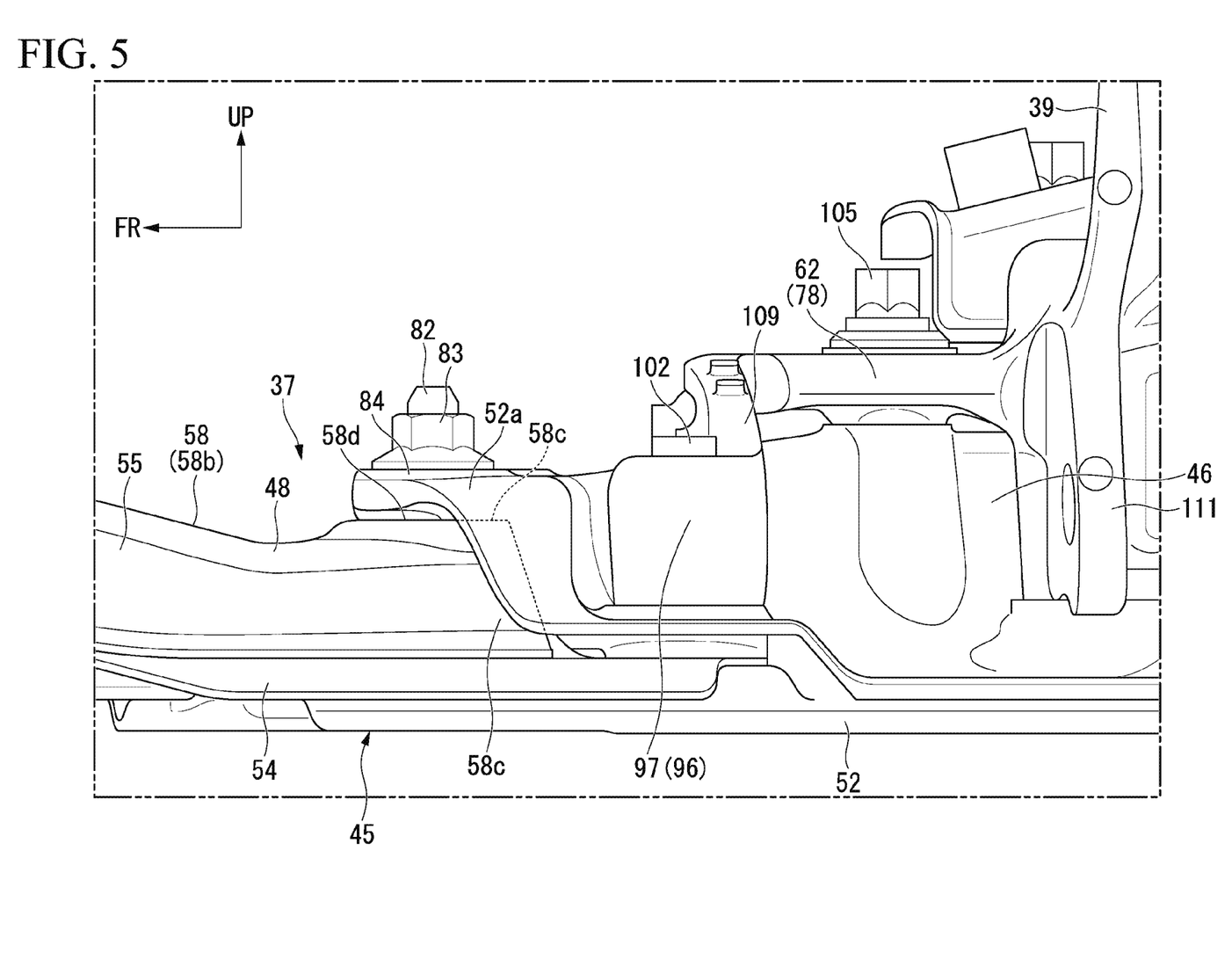
FIG. 5 is a side view showing an enlarged state of a V part of FIG. 4 of an embodiment of the present invention.
Figure 6:
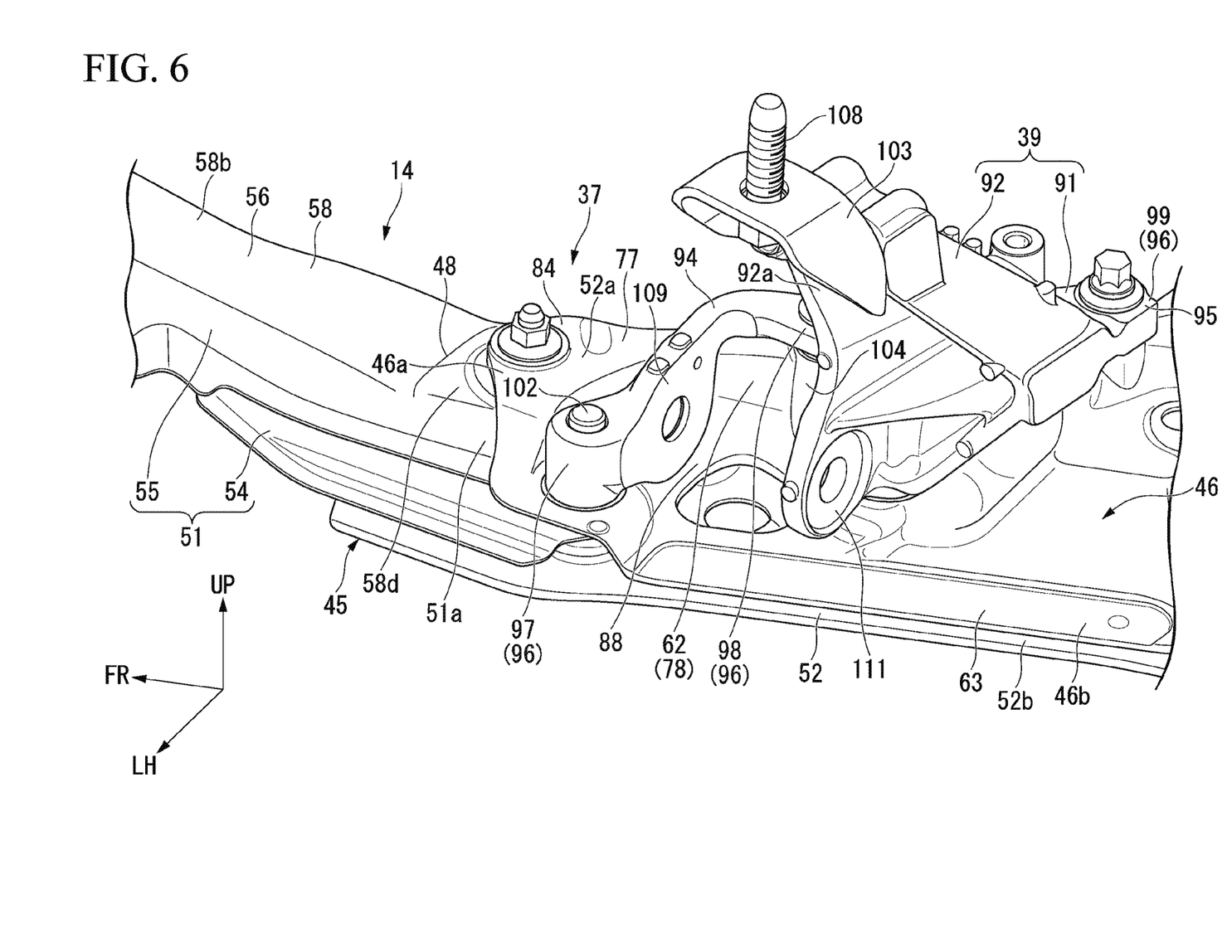
FIG. 6 is a perspective view showing a left longitudinal frame and a left mount member of FIG. 5 of an embodiment of the present invention.

As shown in FIGS. 5 and 6, an upper surface 58 of the second member 55 includes an inclined portion 58b which is formed from the bent portion 48 to the front end 58a (see FIG. 4) and a horizontal portion 58d which is formed from the bent portion 48 to the rear end 58c. The inclined portion 58b extends upward from the bent portion 48 to the front end 58a toward the front side of the vehicle body. The horizontal portion 58d extends horizontally from the bent portion 48 to the rear end 58c toward the rear side of the vehicle body. Thus, the inclined portion 58b is formed in a state bent upward at the bent portion 48 with respect to the horizontal portion 58d.

Here, the bent portion 48 is provided on the front side of the vehicle body with respect to the front end portion 46a of the light metal frame 46. Thus, the bent portion 48 is provided in a portion (that is, a portion of only the steel frame 45) not overlapping the light metal frame 46 in the left longitudinal frame 37. The steel frame 45 is a frame that is preferably easily deformed by the impact load F1 (see FIG. 1) input due to a front collision or the like.

Accordingly, the left longitudinal frame 37 can be preferably bent in the vertical direction (specifically, downward) by the impact load F1 at the bent portion 48 as a starting point.

The rear portion 51a of the front member 51 is joined to the front end portion 52a of the rear member 52 in an overlapping state from above. The rear member 52 is disposed below the light metal frame 46. The light metal frame 46 overlaps the upper side of the rear member 52. That is, the rear member 52 is disposed so as to overlap the light metal frame 46 in the vertical direction. In this state, the rear member 52 and the light metal frame 46 are joined by friction stir welding.

Figure 7:
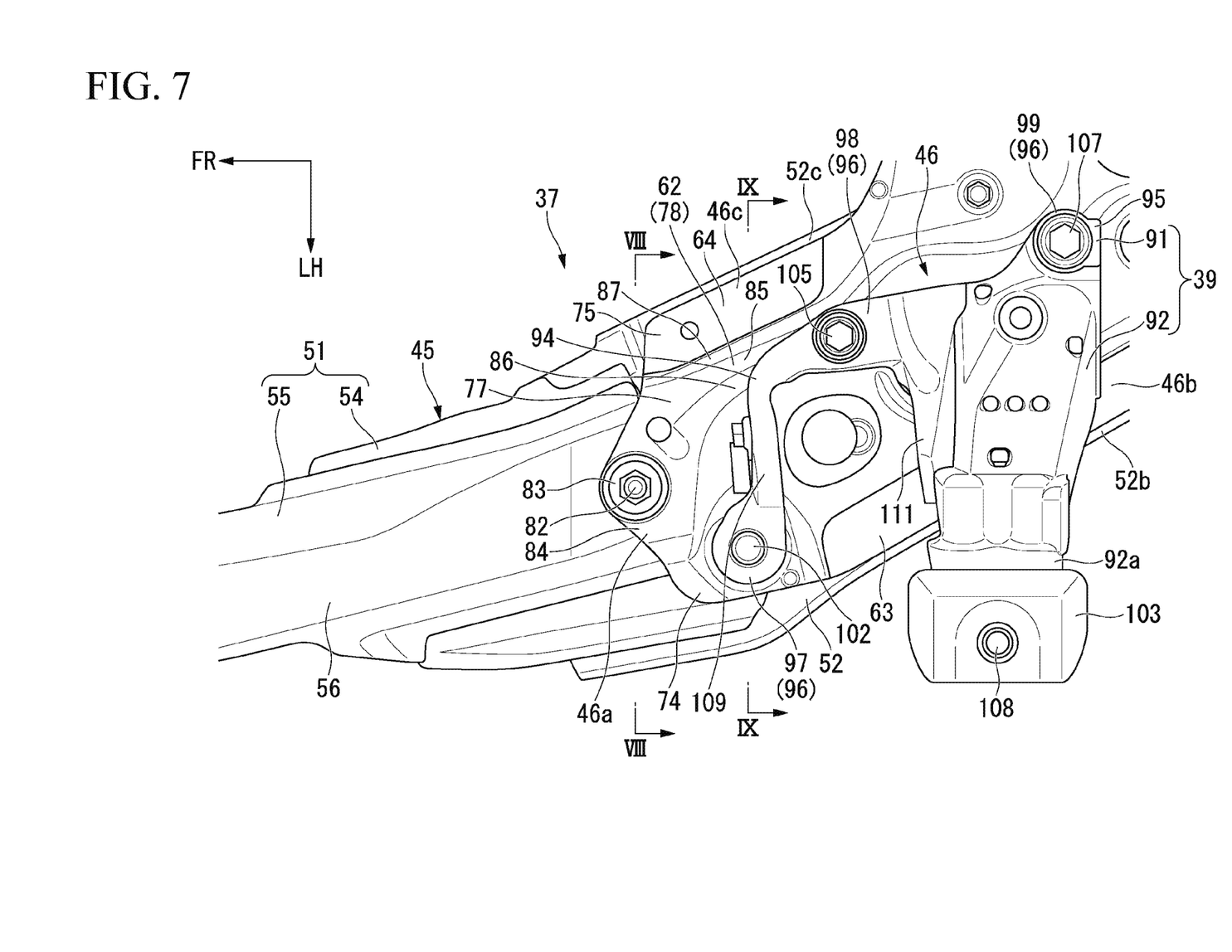
FIG. 7 is a plan view showing the left longitudinal frame and the left mount member of FIG. 6 of an embodiment of the present invention.

As shown in FIGS. 4 and 7, the light metal frame 46 is joined to the rear member 52 from above and extends in the longitudinal direction of the vehicle body along the rear member 52. An outer portion 52b of the rear member 52 and an outer portion 46b of the light metal frame 46 are joined by friction stir welding. Since the outer portion 52b and the outer portion 46b are joined by friction stir welding, an outer joint portion (a joint portion) 63 is formed.

Further, an inner portion 52c of the rear member 52 and an inner portion 46c of the light metal frame 46 are joined by friction stir welding. Since the inner portion 52c and the inner portion 46c are joined by friction stir welding, an inner joint portion (a joint portion) 64 is formed. That is, the light metal frame 46 is joined to the rear member 52 by friction stir welding.

Friction stir welding is a method of pressing a cylindrical protrusion portion in a rotation state and causing the protrusion portion to penetrate into a joint portion of a joint member to generate frictional heat and soften the joint member. At the same time, the vicinity of the joint portion is kneaded in a plastically flowing state due to the rotational force of the protrusion portion so as to integrate a plurality of members.

Here, the steel frame 45 is divided into the front member 51 and the rear member 52 and the bent portion 48 is provided on the side of the front member 51. The bent portion 48 is provided on the front side of the vehicle body in an outer joint portion 63 or an inner joint portion 64. Thus, since the left longitudinal frame 37 is bent in the vertical direction at the bent portion 48 by the impact load F1 (see FIG. 1) which is input to the left longitudinal frame 37 due to a front collision or the like, it is possible to prevent stress concentration on the outer joint portion 63 or the inner joint portion 64.

Accordingly, there is no need to excessively increase the joining strength between the rear member 52 and the light metal frame 46 since both parts are fastened to each other by a bolt or the like. Particularly, since the outer joint portion 63 or the inner joint portion 64 is fastened by a bolt or the like, there is no need to excessively increase the joining strength of the outer joint portion 63 or the inner joint portion 64.

That is, it is possible to preferably bend the left longitudinal frame 37 at the bent portion 48 without compensating the strength of the outer joint portion 63 or the inner joint portion 64.

Further, the bent portion 48 is provided at a position not overlapping the rear member 52 in the vertical direction. Thus, there is no concern that the bending of the left longitudinal frame 37 is disturbed since the bent left longitudinal frame 37 comes into contact with the light metal frame 46 when the left longitudinal frame 37 is bent at the bent portion 48 in the vertical direction by the impact load F1 (see FIG. 1) due to a front collision or the like. Accordingly, it is possible to preferably bend the left longitudinal frame 37 at the bent portion 48 in the vertical direction.

Figure 8:
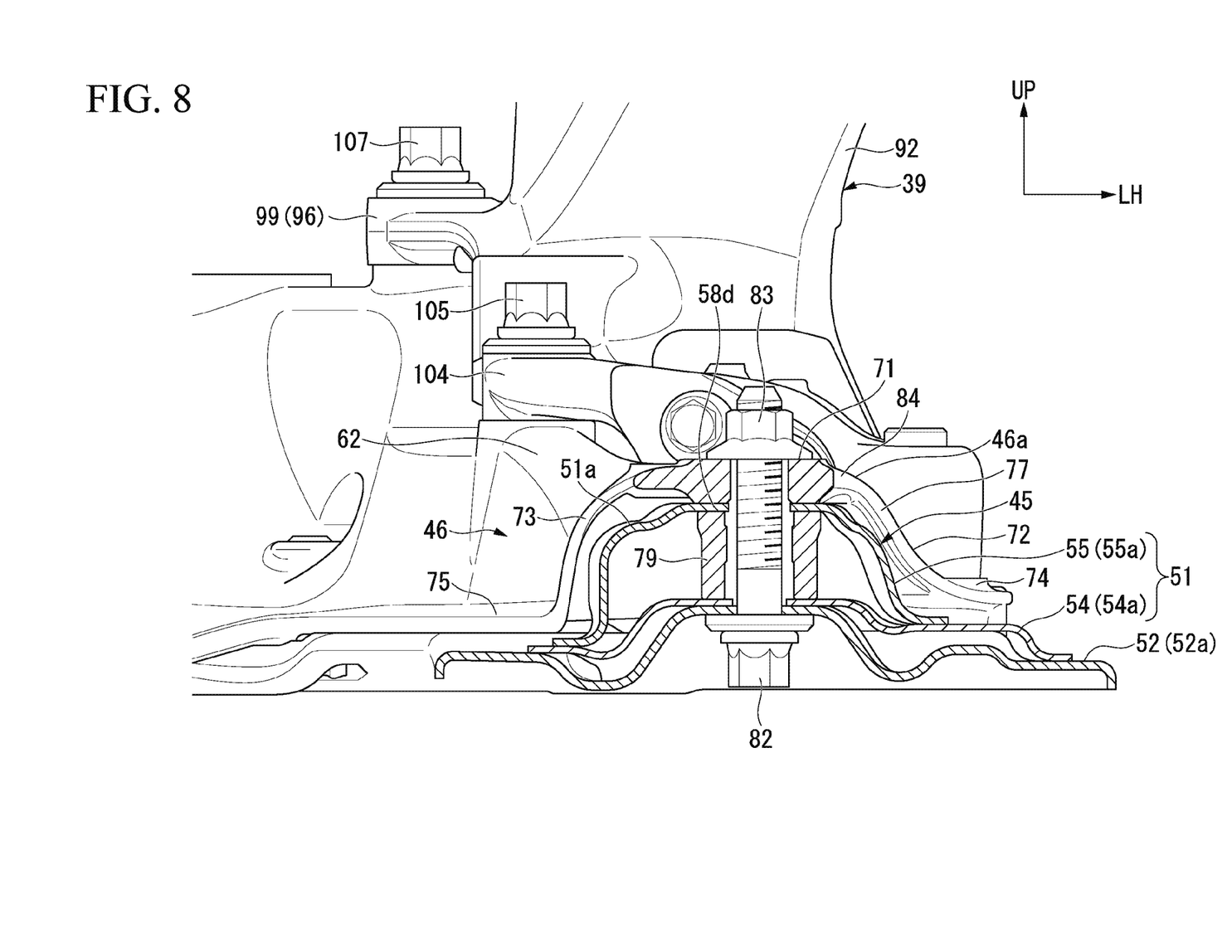
FIG. 8 is a cross-sectional view showing a state after cutting away along a line VIII-VIII of FIG. 7 of an embodiment of the present invention.

As shown in FIGS. 7 and 8, the light metal frame 46 extends in the longitudinal direction of the vehicle body and includes a narrow portion 62 (also see FIG. 9) at a portion near the front end portion 46a.

The light metal frame 46 includes a frame top portion 71, a frame outer wall 72, a frame inner wall 73, a frame outer flange 74, and a frame inner flange 75.

The light metal frame 46 is formed with a U-shaped cross-section by the frame top portion 71, the frame outer wall 72, and the frame inner wall 73. Further, the light metal frame 46 is formed with a hat-shaped cross-section by the frame top portion 71, the frame outer wall 72, the frame inner wall 73, the frame outer flange 74, and the frame inner flange 75.

The frame outer flange 74 (that is, the outer portion 46b of the light metal frame 46) is joined to the outer portion 52b of the rear member 52 by friction stir welding. Further, the frame inner flange 75 (that is, the inner portion 46c of the light metal frame 46) is joined to the inner portion 52c of the rear member 52 by friction stir welding.

Accordingly, a second closed cross-section 77 is formed by the light metal frame 46 and the rear member 52. A narrow closed cross-section 78 is formed in the middle of the second closed cross-section 77.

In the front end portion 46a of the light metal frame 46, the frame top portion 71 is disposed along the upper surface (that is, the horizontal portion) 58d of the rear portion 51a of the front member 51. The frame outer wall 72 extends downward from the outer end of the frame top portion 71. The frame inner wall 73 extend downward from the inner end of the frame top portion 71. The frame outer flange 74 protrudes from the lower end of the frame outer wall 72 outward in the vehicle width direction. The frame inner flange 75 protrudes from the lower end of the frame inner wall 73 inward in the vehicle width direction.

The rear portion 51a of the front member 51 is formed with the first closed cross-section 56 by the first member 54 and the second member 55. A collar 79 is disposed between the first member 54 and the second member 55. In the rear portion 51a of the front member 51, the first member 54 is joined to the front end portion 52a of the rear member 52 in an overlapping state from above.

A bolt 82 penetrates the front end portion 52a of the rear member 52, the rear end portion 54a of the first member 54, the collar 79, and the rear end portion 55a of the second member 55 from below. The penetrating bolt 82 protrudes upward from the frame top portion 71 and a nut 83 is fastened to the bolt 82. Thus, the front end portion 46a of the light metal frame 46 is fastened to the steel frame 45 in the vertical direction.

In this way, a vertical fastening portion 84 is formed by the front end portion 52a of the rear member 52, the rear end portion 54a of the first member 54, the collar 79, the rear end portion 55a of the second member 55, the front end portion 46a of the light metal frame 46, the bolt 82, and the nut 83.

Figure 9:
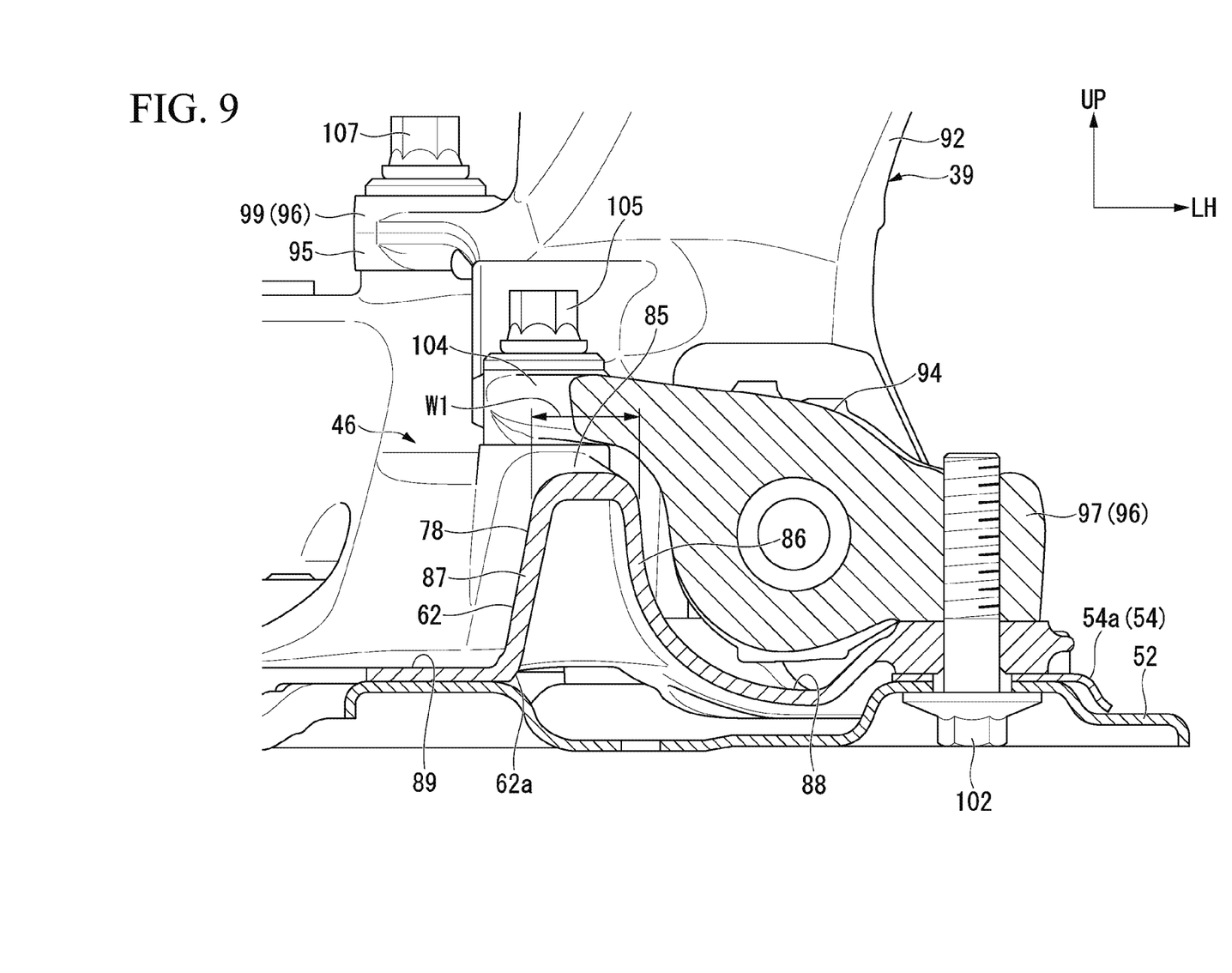
FIG. 9 is a cross-sectional view showing a state broken along a line IX-IX of FIG. 7 of an embodiment of the present invention.

As shown in FIGS. 7 and 9, the narrow portion 62 is formed on the side to the rear in the vehicle body of the front end portion 46a of the light metal frame 46. The narrow portion 62 is formed in a portion of the light metal frame 46 on the inside in the vehicle width direction. The narrow portion 62 includes a narrow top portion 85, a narrow outer wall 86, a narrow inner wall 87, a narrow outer flange 88, and a narrow inner flange 89. The narrow portion 62 is formed with a U-shaped cross-section having a narrow width dimension W1 using the narrow top portion 85, the narrow outer wall 86, and the narrow inner wall 87.

Here, the light metal frame 46 is joined to the rear member 52 by friction stir welding. In this state, an opening portion 62a of the narrow portion 62 is blocked by the rear member 52. That is, the narrow closed cross-section 78 having a narrow width is formed between the light metal frame 46 and the rear member 52 in the vehicle width direction.

The narrow closed cross-section 78 is included in the second closed cross-section 77. The cross-sectional area (cross-section) of the narrow closed cross-section 78 with respect to the second closed cross-section 77 decreases in the vehicle width direction. The second closed cross-section 77 extends in the longitudinal direction of the vehicle body on the inside of the vehicle width direction.

The outer joint portion 63 or the inner joint portion 64 is provided on the rear side of the vehicle body in the left vertical fastening portion 84. The outer joint portion 63 and the inner joint portion 64 are portions joined by friction stir welding.

Here, the left longitudinal frame 37 (specifically, the steel frame 45) is bent at the bent portion 48 in the vertical direction. For this reason, the light metal frame 46 receives a force that separates from the steel frame 45 in the vertical direction. Here, the outer joint portion 63 or the inner joint portion 64 is provided on the rear side of the vehicle body with respect to the vertical fastening portion 84. Thus, a vertical force of separating the steel frame 45 from the light metal frame 46 can be supported by the vertical fastening portion 84. Accordingly, it is possible to prevent stress concentration on the outer joint portion 63 or the inner joint portion 64.

Returning to FIG. 3, the light metal frame 46 is connected to a left end portion 38a of the horizontal frame 38. Further, a right end portion 38b of the horizontal frame 38 is connected to the light metal frame 46 of the right longitudinal frame 37. That is, the light metal frame 46 of the left longitudinal frame 37 and the light metal frame 46 of the right longitudinal frame 37 are connected by the horizontal frame 38. In other words, the rear portion 37a of the left longitudinal frame 37 and the rear portion 37a of the right longitudinal frame 37 are connected by the horizontal frame 38.

As shown in FIGS. 6 and 7, the left mount member 39 is attached to the light metal frame 46 of the left longitudinal frame 37. The left mount member 39 includes a mount base 91 and a mount leg portion 92.

The mount base 91 includes an arm 94 and a protrusion portion 95.

The arm 94 extends from the left mount member 39 toward the front side of the vehicle body. The arm 94 is formed in an L-shape in plan view along the narrow portion 62 of the light metal frame 46 and the front end portion 46a of the light metal frame 46.

The arm 94 includes a first mount fastening portion 97 and a second mount fastening portion 98. The first mount fastening portion 97 is provided in a front end portion of the arm 94. The second mount fastening portion 98 is provided in a base end portion of the arm 94.

The protrusion portion 95 protrudes from the left mount member 39 toward the rear side of the vehicle body and inward in the vehicle width direction. A third mount fastening portion 99 is provided in the protrusion portion 95.

A mount fastening portion 96 is formed by the first mount fastening portion 97, the second mount fastening portion 98, and the third mount fastening portion 99.

The first mount fastening portion 97 is fastened to the rear member 52, the rear end portion 54a of the first member 54, and the narrow outer flange 88 of the light metal frame 46 by a bolt 102 (also see FIG. 9). Further, the first mount fastening portion 97 is provided in a corresponding portion of the narrow closed cross-section 78 in the vehicle width direction (that is, an outer portion of the narrow closed cross-section 78 in the vehicle width direction).

Thus, it is possible to compensate the rigidity of the light metal frame 46 decreased in the narrow closed cross-section 78 (that is, the narrow portion 62) by the first mount fastening portion 97 (that is, the arm 94). Accordingly, it is possible to prevent the longitudinal frame 37 from being bent at the narrow portion 62.

The second mount fastening portion 98 is fastened to an attachment boss 104 by a bolt 105 (also see FIG. 9). The attachment boss 104 is integrally formed with the narrow closed cross-section 78 (specifically, the narrow portion 62). That is, the second mount fastening portion 98 is fastened to the narrow closed cross-section 78 through the attachment boss 104 by the bolt 105.

Here, the first mount fastening portion 97 is fastened to the rear member 52 or the steel frame 45 of the rear end portion 54a of the first member 54 by the bolt 102. Accordingly, since the second mount fastening portion 98 is fastened to the narrow closed cross-section 78 (that is, the narrow portion 62) through the attachment boss 104 by the bolt 105, it is possible to prevent the relative displacement between the steel frame 45 and the second closed cross-section 77 and to reliably prevent the bending at the narrow portion 62.

The third mount fastening portion 99 is provided on the rear side of the vehicle body of the second mount fastening portion 98 in the light metal frame 46. The third mount fastening portion 99 is fastened to the light metal frame 46 by a bolt 107.

In this way, the mount base 91 is attached to the light metal frame 46 or the rear member 52 by the first mount fastening portion 97, the second mount fastening portion 98, and the mount fastening portion 96 of the second mount fastening portion 98. Thus, the mount leg portion 92 is attached to the left longitudinal frame 37 through the mount base 91.

A first boss portion 109 is formed in the arm 94. A second boss portion 111 is formed in the mount leg portion 92. The first boss portion 109 and the second boss portion 111 are provided with a predetermined gap interposed therebetween in the longitudinal direction of the vehicle body. A suspension arm of a suspension part is attached to the first boss portion 109 and the second boss portion 111. That is, the suspension part is supported by the left mount member 39.

As shown in FIGS. 1 and 4, an upper portion 92a of the mount leg portion 92 is attached to an attachment bracket 103 by the pair of bolts 105. The attachment bracket 103 is attached to the left front side frame 24 by a bolt 108. Thus, the upper portion 92a of the left mount member 39 (specifically, the mount leg portion 92) is connected to the left front side frame 24 through the attachment bracket 103, the pair of bolts 105, and the bolt 108.

Accordingly, the sub-frame 14 is attached to the vehicle body frame 12 (that is, the vehicle body).

Figure 10A:
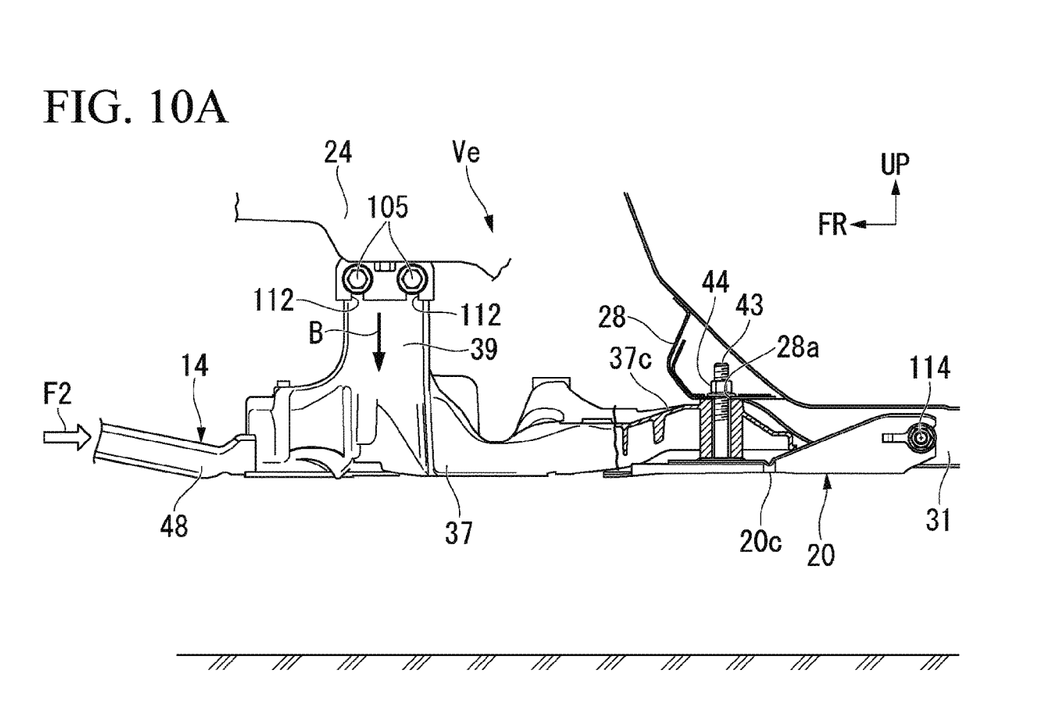
FIG. 10 is a side view illustrating an example in which an impact load is input from a front side of a vehicle body due to a front collision of the sub-frame of an embodiment of the present invention.
Figure 10B:
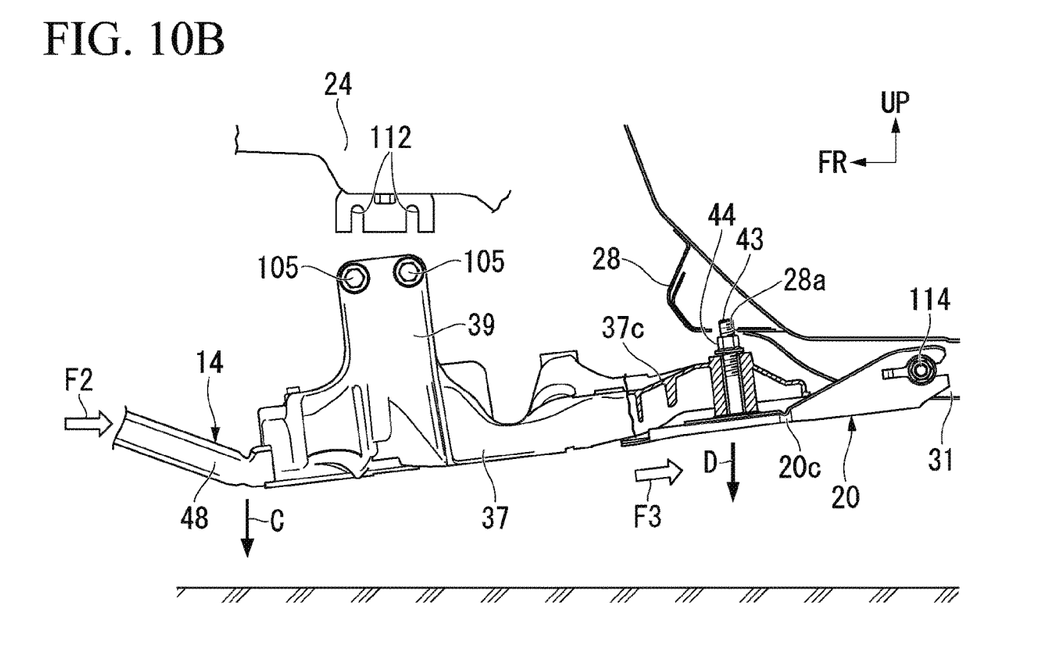

The attachment bracket 103 has an attachment hole 112 (see FIG. 10(b)) which opens downward so that the pair of bolts 105 are inserted therethrough. Thus, since a downward bending force is applied to the bent portion 48 due to the impact load F1, the pair of bolts 105 come out downward from the attachment hole 112. Accordingly, the bent portion 48 is bent downward as indicated by the arrow A due to the impact load F1. Thus, the left longitudinal frame 37 is bent in a V-shape in side view.

The link stay 20 is bridged between the rear end portion 37c of the left longitudinal frame 37 and a front portion 31a of a left floor frame 31. The front connection portion 20a of the link stay 20 is connected to the left fastening bracket 28 from below along with the rear end portion 37c of the left longitudinal frame 37 by the first bolt 43. The left fastening bracket 28 is disposed on the side of the rear portion 24b of the left front side frame 24.

Further, the rear connection portion 20b of the link stay 20 is connected to the front portion of the left floor frame 31 by a second bolt 114.

Next, an example in which the left longitudinal frame 37 of the sub-frame 14 is bent by an impact load when the impact load is input from the front side of the vehicle body to the vehicle Ve will be described with reference to FIGS. 10 and 11.

As shown in FIG. 10(a), the impact load is input from the front side of the vehicle body to the vehicle Ve. Thus, an impact load F2 is input to the front end portion of the left longitudinal frame 37 of the sub-frame 14. Since the impact load F2 is input to the left longitudinal frame 37, a downward bending force is applied to the bent portion 48.

Thus, a downward load is applied to the left mount member 39 so that the bolt 105 comes out downward from the pair of attachment holes 112 as indicated by an arrow B.

As shown in FIG. 10(b), since the bolt 105 comes out downward from the pair of attachment holes 112, the bent portion 48 is bent downward as indicated by an arrow C by the impact load F2. The left longitudinal frame 37 is bent in a V-shape in side view.

In this state, the impact load F2 is continuously input to the left longitudinal frame 37. A pressing force is applied to the nut 44 by the impact load F2. Thus, the nut 44 comes out downward from a through-hole 28a of the left fastening bracket 28 as indicated by an arrow D.

Since the nut 44 comes out from the through-hole 28a, the impact load F3 is input from the rear end portion 37c of the left longitudinal frame 37 to the link stay 20.

Figure 11A:
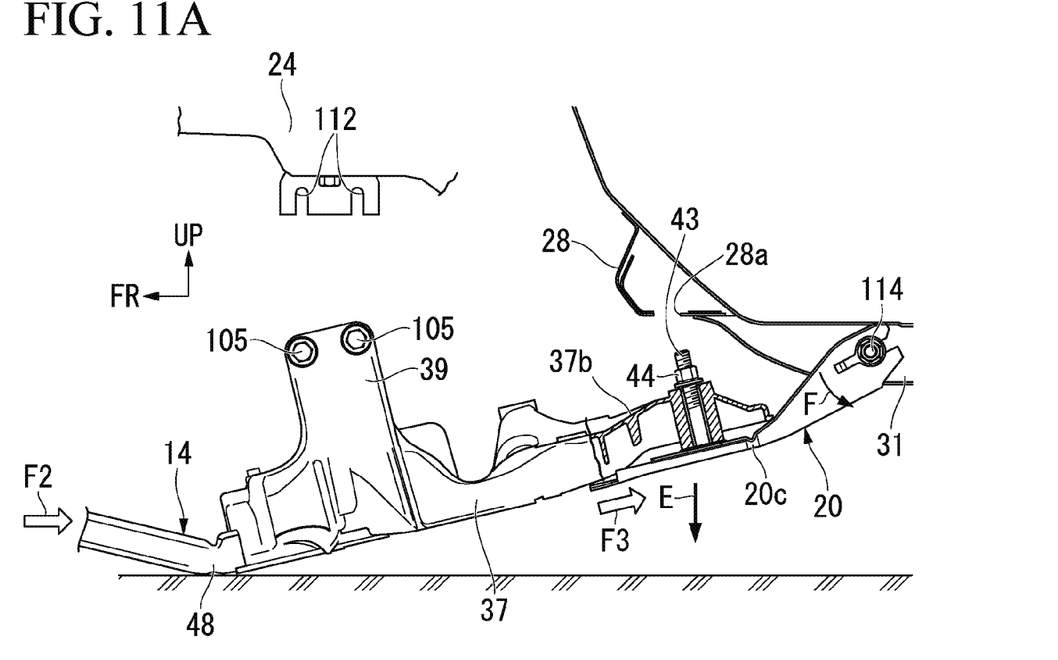
FIG. 11 is a side view illustrating an example in which the sub-frame of an embodiment of the present invention is bent by an impact load.

As shown in FIG. 11(a), the impact load F3 is input to the link stay 20. Thus, the link stay 20 is bent at the bent portion 20c downward as indicated by an arrow E. Since the bent portion 20c is bent downward, the link stay 20 rotates about the second bolt 114 downward as indicated by an arrow F.

Figure 11B:
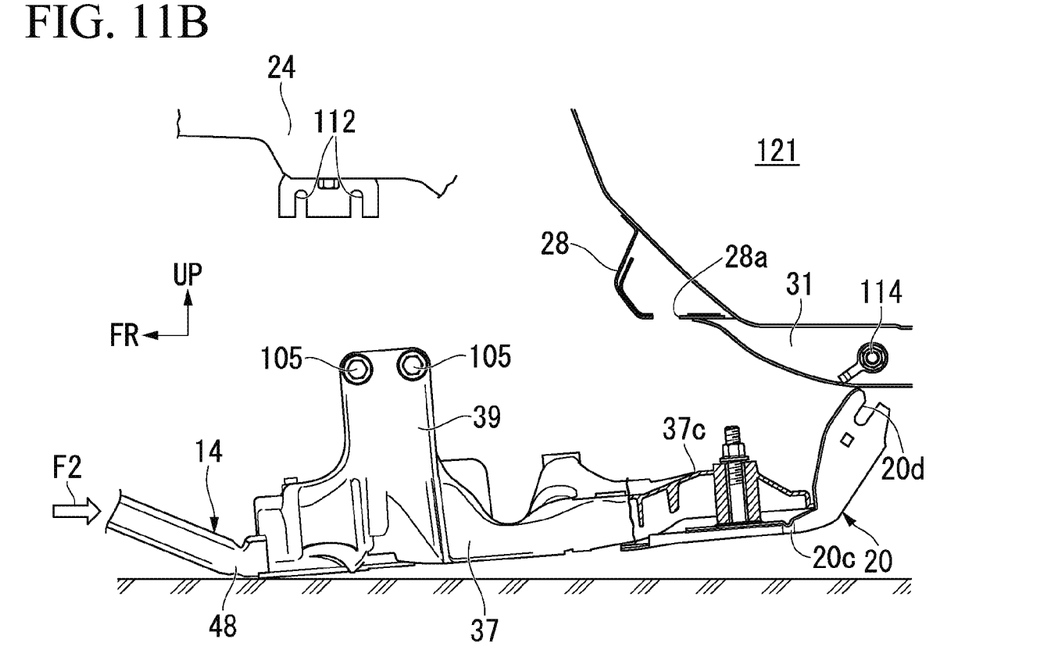

As shown in FIG. 11(b), since the link stay 20 rotates, the support groove 20d comes out of the second bolt 114 and the link stay 20 is separated from the second bolt 114 so as to move downward.

Thus, the rear end portion 37c of the left longitudinal frame 37 can be reliably guided to the lower side of the vehicle compartment 121. Accordingly, the suspension part or the steering member can be reliably guided to the lower side of the vehicle compartment 121 along with the sub-frame 14.

Additionally, the technical scope of the present invention is not limited to the above-described embodiment and can be modified into various forms without departing from the spirit of the present invention.

For example, in the above-described embodiment, an example in which the bent portion 48 is formed in the left longitudinal frame 37 by bending the inclined portion 58b upward with respect to the horizontal portion 58d of the left longitudinal frame 37 has been described, but the present invention is not limited thereto.

As the other example, for example, the bent portion 48 can be also formed by providing a bead in the left longitudinal frame 37 so as to extend in the vehicle width direction. Further, the bent portion 48 can be also formed by providing a slit, an opening portion, or the like in the left longitudinal frame 37. Further, the bent portion 48 can be also formed by changing the material of the left longitudinal frame 37.

In addition, the components of the above-described embodiment can be replaced by known components and the above-described modified examples may be combined without departing from the spirit of the present invention.

INDUSTRIAL APPLICABILITY

According to the front vehicle body structure, this structure can be applied to an automobile equipped with a sub-frame or the like.

REFERENCE SIGNS LIST

10 Front vehicle body structure
12 Vehicle body frame (vehicle body)
14 Sub-frame
29 Power unit room
37 Left and right longitudinal frames (pair of longitudinal frames)
37a Rear portions of left and right longitudinal frames (rear portions of pair of longitudinal frames)
38 Horizontal frame
39 Left and right mount members (mount members)
45 Steel frame
46 Light metal frame
46a Front end portion of light metal frame
48 Bent portion
51 Front member
52 Rear member (part of steel frame)
52a Front end portion of rear member
56 First closed cross-section (closed cross-section)
63 Outer joint portion (joint portion)
64 Inner joint portion (joint portion)
77 Second closed cross-section
78 Narrow closed cross-section
84 Left and right vertical fastening parts
96 Mount fastening portion
97 First mount fastening portion
98 Second mount fastening portion
99 Third mount fastening portion

What is claim is:

1. A front vehicle body structure in which a sub-frame is provided below a power unit room of a front portion of a vehicle,
   wherein the sub-frame includes a pair of longitudinal frames extending in a longitudinal direction of a vehicle body and a horizontal frame connecting rear portions of the longitudinal frames,
   wherein the longitudinal frame includes a steel frame made of steel and a light metal frame made of light metal,
   wherein the steel frame is configured by:
      a front member which has a closed cross-section extending in the longitudinal direction of the vehicle body and is not joined to the light metal frame by friction stir welding; and
      a rear member which is disposed below the light metal frame and is joined to the light metal frame by friction stir welding,
   wherein a rear portion of the front member is joined to a front end portion of the rear member,
   wherein the longitudinal frame includes a bent portion to be a starting point at which the longitudinal frame is bent in the vertical direction, and
   wherein the bent portion is provided in a portion on the front side of the vehicle body with respect to the front end portion of the rear member in the front member of the steel frame on the front side of the vehicle body with respect to a front end portion of the light metal frame.

2. The front vehicle body structure according to claim 1,
   wherein the sub-frame includes a mount member for attaching the sub-frame to the vehicle body,
   wherein the light metal frame has a second closed cross-section extending in the longitudinal direction of the vehicle body between the light metal frame and the rear member,
   wherein the second closed cross-section has a narrow closed cross-section decreasing in cross-section in a vehicle width direction, and
   wherein a mount fastening portion fastening the mount member, the light metal frame, and the front member is provided in a corresponding portion of the narrow closed cross-section in the vehicle width direction.

3. The front vehicle body structure according to claim 2,
   wherein the mount member includes a second mount fastening portion fastened to the narrow closed cross-section.

4. The front vehicle body structure according to claim 1,
   wherein the sub-frame includes a vertical fastening portion fastening the steel frame and the light metal frame in the vertical direction, and
   wherein a joint portion obtained by joining the steel frame and the light metal frame through friction stir welding is provided on the rear side of the vehicle body with respect to the vertical fastening portion.

* * * * *